(12) United States Patent
Liu et al.

(10) Patent No.: US 10,640,941 B2
(45) Date of Patent: May 5, 2020

(54) WATER CONSERVING, SECURE, AND ENVIRONMENTNT PROTECTIVE DEVICE

(71) Applicant: Zhijun Wang, Shenzhen (CN)

(72) Inventors: Xiaojun Liu, Shenzhen (CN); Caixia Wang, Shenzhen (CN); Junlong Liu, Shenzhen (CN)

(73) Assignee: Zhijun Wang, Shenzhen (CN)

( * ) Notice: Subject to any disclaimer, the term of this patent is extended or adjusted under 35 U.S.C. 154(b) by 0 days.

(21) Appl. No.: 16/178,600

(22) Filed: Nov. 2, 2018

(65) Prior Publication Data
US 2019/0242086 A1 Aug. 8, 2019

(30) Foreign Application Priority Data

Feb. 8, 2018 (CN) .......................... 2018 1 0130797

(51) Int. Cl.
| E02B 11/00 | (2006.01) |
| E03F 5/04 | (2006.01) |
| G05B 19/048 | (2006.01) |
| G05B 19/042 | (2006.01) |
| B01D 46/00 | (2006.01) |

(52) U.S. Cl.
CPC .......... *E02B 11/005* (2013.01); *E03F 5/0407* (2013.01); *G05B 19/042* (2013.01); *G05B 19/048* (2013.01); *B01D 46/0004* (2013.01); *B01D 46/0036* (2013.01)

(58) Field of Classification Search
None
See application file for complete search history.

(56) References Cited

U.S. PATENT DOCUMENTS

| 2,816,858 A * | 12/1957 | Walker ................ B01D 3/4216 203/2 |
| 2013/0284021 A1* | 10/2013 | Miyamoto ......... B01D 53/1418 95/183 |

* cited by examiner

*Primary Examiner* — Richard C Gurtowski

(57) ABSTRACT

A water conserving, secure and environment protective device includes a stationary base, a reflux column connected with the stationary base and a floating mechanism assembly sleeved on the reflux column. The reflux column defining a plurality of reflux holes to reflux an external water source. A water absorption mechanism assembly includes a plurality of supporting frames, a water pump arranged on an upper portion of the supporting frames, and a plurality of water suction pipes communicated with the water pump to suck the external water source.

4 Claims, 3 Drawing Sheets

WATER CONSERVING, SECURE, AND ENVIRONMENTNT PROTECTIVE DEVICE

BACKGROUND

1. Field

The present disclosure relates to the field of water conserving security environmental protection device technology, and particular to a water conserving security and environment protective device with high automation, reasonable structural design, high degree of intelligence, convenient control, and capable of automatically draining floods.

2. Description of Prior Art

Reservoirs are a common water storage and flood discharge facility and because they can better control water sources, they have been widely used in many areas. Nowadays, the simplest overflow flood discharge is basically used in current reservoirs instead of flood discharge valves. One specific method is to open a flood discharge channel on the dam or open flood discharge holes on the dam. However, due to the opening of the flood discharge channel on the dam, the dam is easily flooded during the flood season. Further, due to the opening of the flood discharge holes on the dam, floating objects in the flood may block the flood discharge holes, which in turn causes the flood to flow over the dam, causing greater environmental damage.

Based on the above problems, how to achieve a zero impact on the flood resistance of the dam and carry out automatic drainage of floods are frequently considered by those skilled in the art. A lot of research and development and experiments have been carried out, and good results are achieved.

SUMMARY

In order to overcome the problems existing in the prior art, the present disclosure provides a water conserving, secure, and environment protective device with high automation, reasonable structural design, high degree of intelligence, convenient control and further be capable of automatically draining floods.

Compared with the prior art, in an actual use process, the present disclosure of the water conserving, secure, and environment protective device with high-automation comprises a floating body. Since the floating body moves up and down on the reflux column, realizing a flexible drainage or an undrained control of the reflux column, and an effect of safety adjustment is achieved. The water conserving, secure, and environment protective device is reasonable in structural design, good in use effects, and strong in temperature.

DETAILED DESCRIPTION

To make the objects, technical proposals and merits of the present disclosure more apparent, the present disclosure will be further described in detail with reference to the drawings and embodiments. It should be understood that the embodiments described here are only used to illustrate the present disclosure and are not intended to limit the present disclosure.

Figure 1:
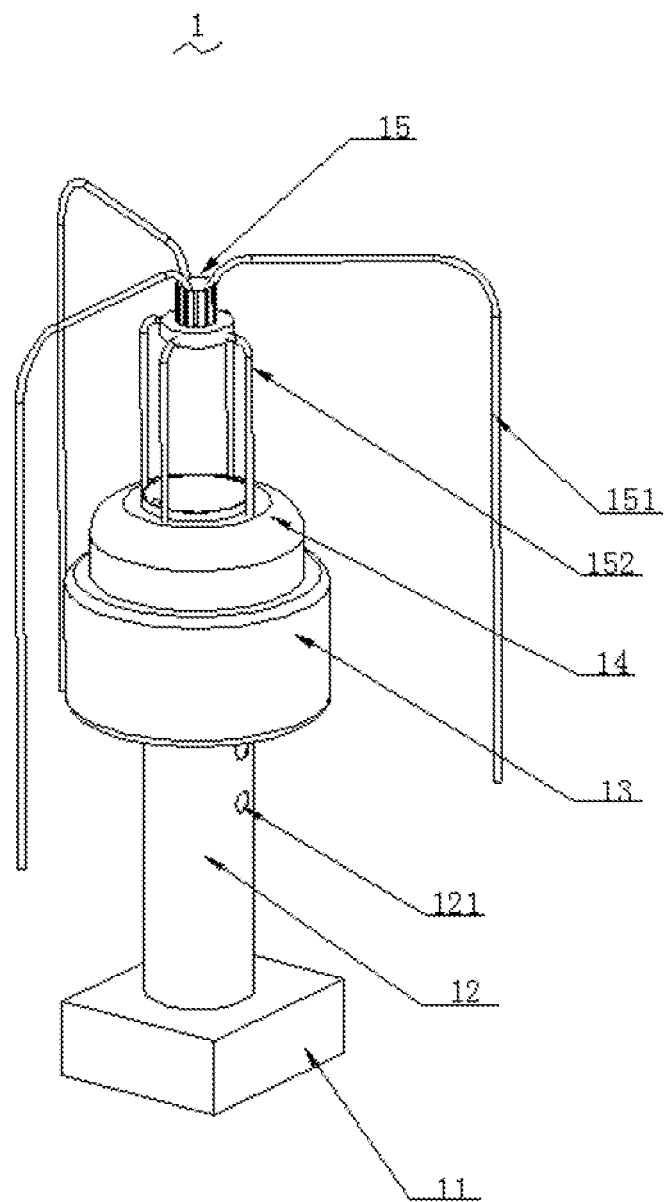
FIG. 1 is a perspective view showing a structure diagram of a water conserving, secure, and environment protective device of the present disclosure.
Figure 2:
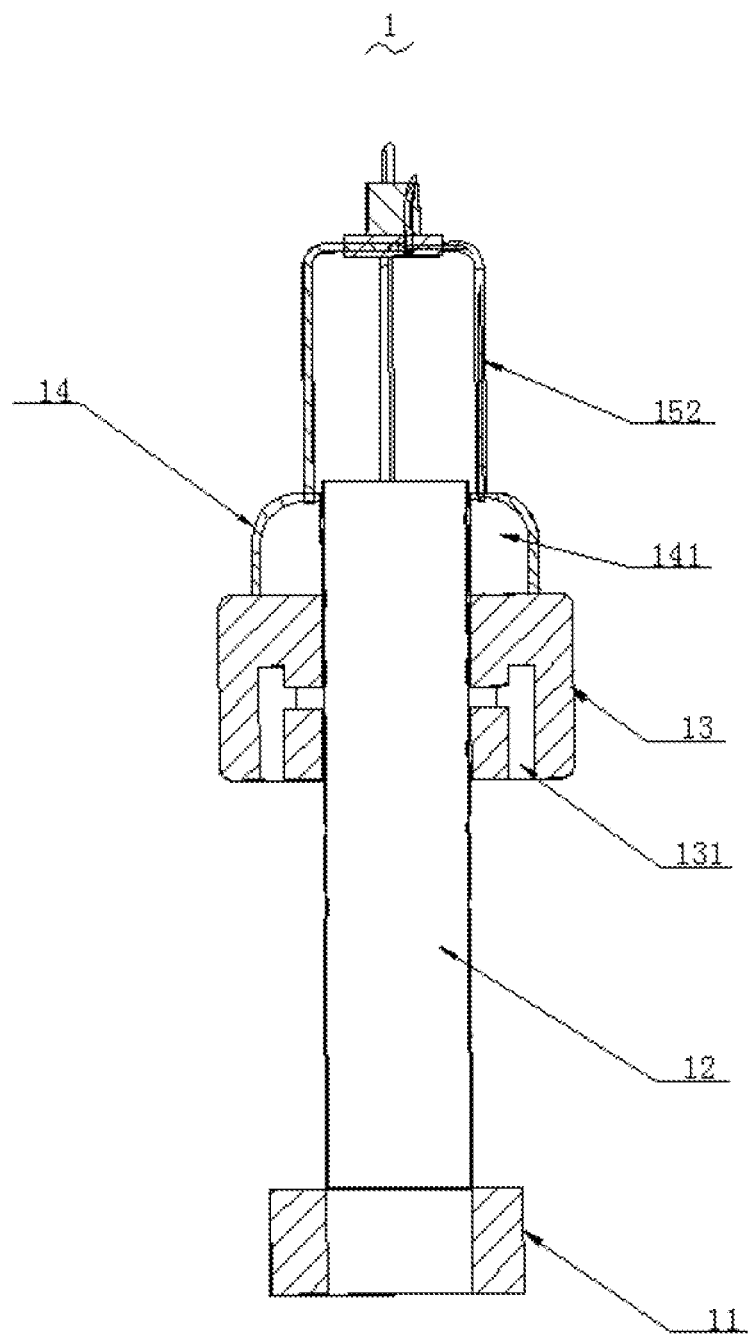
FIG. 2 is a cross-sectional view showing a structure diagram of the water conserving, secure, and environment protective device of the present disclosure.
Figure 3:
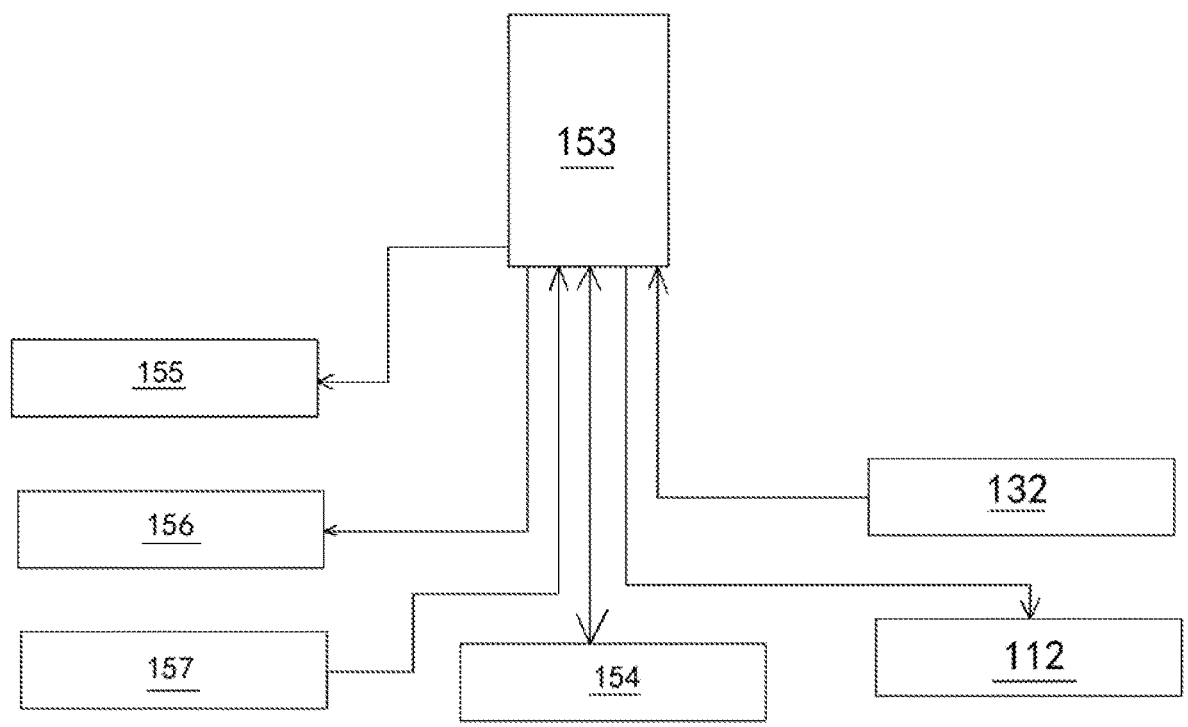
FIG. 3 is a structure diagram of the water conserving, secure, and environment protective device of the present disclosure.

As shown in FIG. 1 to FIG. 3, the present disclosure of a water conserving, secure, and environment protective device 1 with high-automation comprises a stationary base 11, a reflux column 12 connected with the stationary base 11, and a floating mechanism assembly 13 sleeved on the reflux column 12.

The stationary base 11 is square shaped. The reflux column 12 has a hollow cylindrical shape. The reflux column 12 defining a plurality of reflux holes 121 to reflux an external water source. An aperture of any of the reflux holes 121 ranges from 8-15 cm. The floating mechanism assembly 13 comprises a cylindrical floating body, a water storage box 14 arranged on an upper portion of the floating body, and a water absorption mechanism assembly arranged on an upper portion of the water storage box 14.

The water absorption mechanism assembly comprises a plurality of supporting frames 152, a water pump 15 arranged on an upper portion of the supporting frames 152, and a plurality of water suction pipes 151 communicated with the water pump 15 to suck the external water source. The water suction pipes 151 are bent in an L shape. And a diameter of any of the water suction pipes 151 ranges from 3-5 cm. The supporting frames 152 are hollow. And a bottom portions of any of the support frames 152 is communicated with the water storage box 14. The external water source pumped by the water pump 15 is conveyed to the water storage box 14 through the supporting frames 152. A bottom portion of the reflux column 12 is communicated with an external discharge pipeline. A reflux channel 131 is arranged in an interior of the floating body to convey the external water source of an external pool from the reflux holes 121 to an interior of the reflux column 12. The reflux channel 131 is L-shaped. And the interior of the floating body defining a through hole communicated with the reflux channel 131. An aperture of the through hole is greater than the aperture of each of the reflux holes 121. The aperture of the through hole ranges from 14-20 cm.

The water conserving, secure, and environment protective device further comprises a controller 153, a wireless communication transmission unit 154, an alerter 155, a signal indicator light 156 and a solar panel mechanism assembly. The solar panel mechanism assembly is configured to collect an external solar energy. The wireless communication transmission unit 154, the alerter 155, the signal indicator light 156, the water pump 15 and the solar panel mechanism assembly are electrically connected with the controller 153. A filter assembly is arranged inside the reflux channel 131 of the floating body to clean and filter the water source. The filter assembly comprises a plurality of filter plates. The filter plates comprise an activated carbon filter plate, a quartz sand filter plate, a sponge filter plate, and an anthracite filter plate. And the activated carbon filter plate, the quartz sand filter plate, the sponge filter plate, and the anthracite filter plate are sequentially increased in thickness. A thickness of the activated carbon filter plate ranges from 4.3 cm to 7.2 cm. A thickness of the quartz sand filter plate ranges from 7.3 cm to 8.4 cm. A thickness of the sponge filter plate ranges from 8.6 cm to 9.2 cm. A thickness of the anthracite filter plate ranges from 9.4 cm to 10.2 cm.

The solar panel mechanism assembly comprises a solar panel, a fixing base configured to fix the solar panel and a light sensing sensor 157 configured to sense external light orientation. The fixing base and the solar panels are connected through a rotating shaft. A rotation drive motor 112 is arranged at the rotating shaft to drive the solar plate to rotate. And the rotation drive motor 112, the light sensing sensor 157 are electrically connected with the controller 153. A diameter of the reflux column 12 ranges from 40-55 cm. The floating body is filled with sponge. And a humidity sensor 132 is arranged in the interior of the floating body. The humidity sensor 132 is electrically connected with the controller 153.

The present disclosure of the water conserving, secure, and environment protective device 1 with high-automation comprises the stationary base 11, the reflux column 12 connected with the stationary base 11, and the floating mechanism assembly 13 sleeved on the reflux column 12. The stationary base 11 is square shaped. The reflux column 12 has the hollow cylindrical shape. The reflux column 12 defining a plurality of reflux holes 121 to reflux the external water source. The aperture of each of the reflux holes 121 ranges from 8-15 cm. In combination with the specific structural configuration of the floating mechanism assembly 13, the floating mechanism assembly 13 comprises the cylindrical floating body, the water storage box 14 arranged on the upper portion of the floating body and the water absorption mechanism assembly arranged on the upper portion of the water storage box 14. The water absorption mechanism assembly comprises a plurality of supporting frames 152, the water pump 15 arranged on the upper portion of the supporting frames 152 and a plurality of water suction pipes 151 communicated with the water pump 15 to suck the external water source. In an actual use process, since the floating body moves up and down on the reflux column 12, realizing a flexible drainage or an undrained control of the reflux column 12, and an effect of safety adjustment is achieved. The water conserving, secure, and environment protective device 1 is reasonable in structural design, good in use effects, and strong in temperature.

Furthermore, a water pump base is arranged at a lower portion of the water pump 15 to support the water pump 15. An upper end of each supporting frame 152 is communicated with the water pump base.

Furthermore, a number of the supporting frames 152 is four; a number of the water suction pipes 151 is three.

Furthermore, a length of each of the water suction pipes 151 is greater than a sum of heights of the floating body, the water storage box 14 and the supporting frame 152.

Compared with the prior art, the present disclosure of the water conserving, secure, and environment protective device 1 with high-automation comprises the stationary base 11, the reflux column 12 connected with the stationary base 11, and the floating mechanism assembly 13 sleeved on the reflux column 12. The stationary base 11 is square shaped. The reflux column 12 has the hollow cylindrical shape. The reflux column 12 defining a plurality of reflux holes 121 to reflux the external water source. The aperture of each of the reflux holes 121 ranges from 815 cm. In combination with the specific structural configuration of the floating mechanism assembly 13, the floating mechanism assembly 13 comprises the cylindrical floating body, the water storage box 14 arranged on the upper portion of the floating body and the water absorption mechanism assembly arranged on the upper portion of the water storage box 14. The water absorption mechanism assembly comprises a plurality of supporting frames 152, the water pump 15 arranged on the upper portion of the supporting frames 152 and a plurality of water suction pipes 151 communicated with the water pump 15 to suck the external water source. In the actual use process, since the floating body moves up and down on the reflux column 12, realizing the flexible drainage or the undrained control of the reflux column 12, and the effect of safety adjustment is achieved. The water conserving, secure, and environment protective device 1 is reasonable in structural design, good in use effects, and strong in temperature.

The above-described embodiments of the present disclosure are not to be construed as limiting the scope of the present disclosure. Any of the modifications, equivalent replacement, and improvement within the spirit and principle of the present disclosure should fall within the protection scope of the claims.

What is claimed is:

1. A water conserving, secure, and environment protective device, comprising:
   a stationary base;
   a reflux column connected with the stationary base; and
   a floating mechanism assembly sleeved on the reflux column;
   wherein the stationary base is square shaped; and the reflux column has a hollow cylindrical shape; the reflux column defining a plurality of reflux holes to reflux an external water source; an aperture of each of the reflux holes ranges from 8-15 cm; the floating mechanism assembly comprises a cylindrical floating body, a water storage box arranged on an upper portion of the floating body, and a water absorption mechanism assembly arranged on an upper portion of the water storage box;
   wherein the water absorption mechanism assembly comprises a plurality of supporting frames, a water pump arranged on an upper portion of the supporting frames, and a plurality of water suction pipes communicated with the water pump to suck the external water source; the water suction pipes are bent in an L shape; and a diameter of each of the water suction pipes ranges from 3-5 cm; the supporting frames are hollow; and a bottom portion of any of the support frames is communicated with the water storage box; the external water source, pumped by the water pump, is conveyed to the water storage box through the supporting frames; a bottom portion of the reflux column is communicated with an external discharge pipeline; a reflux channel is arranged in an interior of the floating body to convey the external water source of an external pool from the reflux holes to an interior of the reflux column; the reflux channel is L-shaped, and the interior of the floating body defining a through hole communicated with the reflux channel; an aperture of the through hole is greater than the aperture of each of the reflux holes; the aperture of the through hole ranges from 14-20 cm;
   the water conserving, secure, and environment protective device further comprises a controller arranged at the water pump, a wireless communication transmission unit, an alerter, a signal indicator light and a solar panel mechanism assembly; the solar panel mechanism assembly is configured to collect an external solar energy; the wireless communication transmission unit, the alerter, the signal indicator light, the water pump, and the solar panel mechanism assembly are electrically connected with the controller; a filter assembly is arranged inside the reflux channel of the floating body to clean and filter the water source; the filter assembly comprises a plurality of filter plates, and the filter plates comprise an activated carbon filter plate, a quartz sand filter plate, a sponge filter plate, and an anthracite filter plate; and the activated carbon filter plate, the quartz sand filter plate, the sponge filter plate, and the anthracite filter plate are sequentially increased in thickness; a thickness of the activated carbon filter plate ranges from 4.3-7.2 cm; a thickness of the quartz sand filter plate ranges from 7.3-8.4 cm; a thickness of the sponge filter plate ranges from 8.6-9.2 cm; a thickness of the anthracite filter plate ranges from 9.4-10.2 cm;

wherein the solar panel mechanism assembly comprises a solar panel, a fixing base configured to fix the solar panel and a light sensing sensor configured to sense external light orientation; the fixing base and the solar panel are connected through a rotating shaft; a rotation drive motor is arranged at the rotating shaft to drive the solar panel to rotate; and the rotation drive motor, the light sensing sensor are electrically connected with the controller; a diameter of the reflux column ranges from 40-55 cm; the floating body is filled with sponge; and a humidity sensor is arranged in the interior of the floating body; the humidity sensor is electrically connected with the controller.

2. The water conserving, secure, and environment protective device according to claim 1, wherein a water pump base is arranged at a lower portion of the water pump to support the water pump; an upper end of each supporting frame is communicated with the water pump base.

3. The water conserving, secure, and environment protective device according to claim 1, wherein a number of the supporting frames is four; a number of the water suction pipes is three.

4. The water conserving, secure, and environment protective device according to claim 1, wherein a length of each of the water suction pipes is greater than a sum of heights of the floating body, the water storage box, and the supporting frame.

* * * * *